Figure 1:
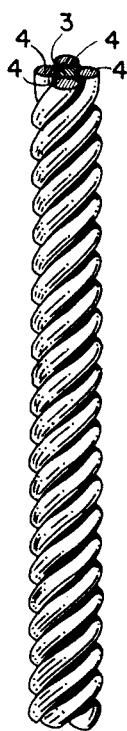

Dec. 21, 1954  H. ROBINSON  2,697,771
WELD ROD AND METHOD OF MAKING
Filed May 24, 1951

INVENTOR
HAROLD ROBINSON
BY
ATTORNEY

United States Patent Office 2,697,771
Patented Dec. 21, 1954

2,697,771

WELD ROD AND METHOD OF MAKING

Harold Robinson, Somerville, N. J., assignor to Air Reduction Company, Incorporated, a corporation of New York Application May 24, 1951, Serial No. 228,009

5 Claims. (Cl. 219—8)

This invention relates to composite weld rods, their manufacture, and use, and more particularly to such composite weld rods containing copper in amounts to form copper base alloys.

Welding of one such copper alloy, lead bronze, has been performed heretofore with the aid of lead-bronze alloy weld rods. The term lead-bronze, as used herein, means an alloy comprising essentially lead, tin and copper in the amounts of from about 8 per cent to about 30 per cent lead, from about 4 per cent to about 12 per cent tin, and the balance substantially all copper. This alloy has excellent bearing properties and lead-bronze overlay welding is desirable in many phases of industry. One such use is on locomotive driving-box laterals and crowns. Another use of lead-bronze welding is in the repair of lead-bronze castings with lead-bronze weld metal. There are, of course, many other uses.

Many problems are encountered in the manufacture of lead-bronze alloy weld rods. Lead-bronze is a non-ductile alloy that cannot be drawn into wire, or at least cannot be so treated economically. As a result, the only way lead-bronze alloy weld rods can be made is by casting them or by a series of operations including casting, and repeated annealing and swaging operations. The cost of such operations is ordinarily prohibitive. Cast rods, if not further worked, can only be supplied in relatively large diameters and short lengths. Under no circumstances can lead-bronze alloy rods be supplied commercially in coiled form on a reel to be dispensed by withdrawing the wire from the reel and feeding it to a continuous welding operation, because the alloy is so brittle it cannot be coiled and uncoiled without cracking.

In addition, lead-bronze alloy weld deposits are largely special purpose weld deposits requiring precise properties of the weld metal. As a result, there is a demand for a variety of special alloys. If alloy rods are made for each of these special requirements, special heats must be prepared by the foundry for each. This greatly adds to the cost of the alloy rods.

It is therefore an object of this invention to provide a novel weld rod for lead-bronze welding that is less costly and more satisfactory in use than weld rods of lead-bronze alloy.

Another object of this invention is to provide a method of making a weld rod for lead-bronze welding.

Another object of this invention is to provide a novel method of forming a lead-bronze weld deposit.

Another object is to provide a stranded copper base electrode and a method of making the same, in which the most readily melted strand is surrounded by and in intimate electrical and thermal contact with the less readily melted strands.

This invention is based on the discovery that an entirely satisfactory homogeneous lead-bronze weld deposit can be made by employing a composite welding rod composed of certain ductile component elements fabricated together or otherwise physically united as distinguished from being fused together as a brittle homogeneous alloy. The individual ductile components may be copper and a lead-tin alloy. Alternatively, the tin may be alloyed with the copper instead of with the lead, or it may be divided between the lead and the copper, or it may be supplied separately.

It has been found that a satisfactory weld deposit of lead-bronze can be formed by employing such composite weld rods regardless of whether the rod is used as filler rod or as a consuming electrode. For example, the rod of the present invention has been found satisfactory in a continuous arc welding operation of the type disclosed in Muller et al. Patent No. 2,504,868; as a filler rod in carbon arc and inert gas shielded non-consuming electrode arc welding; and as a coated or bare electrode.

Typical weld rods embodying the present invention are represented by the accompanying drawing in which Fig. 1 represents a section of weld rod having a core 3 of lead-tin alloy surrounded by four copper wires designated 4. Weld rods of this type are readily formed by twisting the ductile copper wires around the lead-tin alloy core. For simplicity, the respective wires have been shown as being of equal transverse area, or gauge, but it will be understood that the invention also contemplates the use of wires of different diameters.

Figure 2:
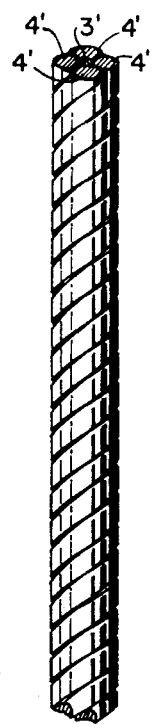

Fig. 2 represents a modification of the weld rod of Fig. 1, the exterior surface being substantially cylindrical. Primed reference numerals correspond to the reference numerals of Fig. 1.

Figure 3:
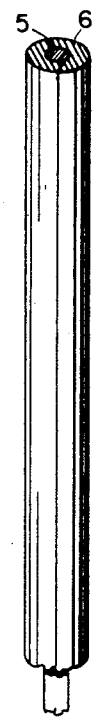

Fig. 3 of the drawing represents a section of weld rod having a core 5 of lead-tin alloy and a solid sheath 6 of copper. Weld rods of this type are readily formed by wrapping the ductile copper around the lead-tin alloy core.

The weld rods of this invention are composed of two or more elongated ductile elements or strands containing in aggregation the required amounts of lead, tin and copper to form a lead-bronze weld deposit. In the weld rod of Fig. 1, for example, a composite weld rod was made by twisting four .030 inch diameter electrolytic copper wires around a .035 inch diameter lead-tin alloy wire as a core. The core wire was a 70 per cent lead–30 per cent tin alloy by weight. In aggregation, the composite weld rod so formed contains 77.8 per cent copper by weight and 22.2 per cent of the lead-tin alloy core wire. Broken down further, the analysis of the composite rod by weight is seen to be 77.8 per cent copper, 15.54 per cent lead and 6.66 per cent tin, the same proportions of these elements as are present in lead-bronze. Since this composite weld rod was used as a depositing arc welding electrode fed through a tubular current pickup shoe, as in Muller et al. Patent No. 2,504,868, it was found advantageous to draw it through a sizing die to produce a uniform outside diameter of .087 inch. The twisting is preferably done tight enough to cause extrusion of the lead-tin alloy core wire into the voids between the core wire and the copper wire and place the individual wires in more intimate contact. This is advantageous in that it provides better thermal and electrical conductivity between wires and makes the burn-off rate of the rod extremely uniform. The possibility of the lead-tin alloy melting back prematurely because of radiant heat pick-up is eliminated by having the lead-tin alloy as a core sheathed in copper, and in heat conducting contact therewith. The core and the surrounding stranded wires, respectively, are of uniform transverse area throughout, so that the relative proportions of lead, tin and copper are the same throughout the length of the weld rod. The weld deposit produced by such a rod is perfectly homogeneous and has all the properties of lead-bronze weld metal deposited by a cast rod.

An alternative type of rod is produced by covering a core of lead-tin alloy wire with a solid sheath of copper.

In another form of the invention, ductile copper and lead-tin alloy wires may be braided or twisted or otherwise fastened together. The proportion of lead-tin alloy to copper is readily regulated by varying the number and size of the respective components. Each of the wires is very easily fabricated and there is no limit, as far as rod manufacturing is concerned, to the percentage of any element in the rod. Being ductile, the component wires are readily braided or twisted together to form the composite rod.

A further type of rod within the contemplation of my present invention is one such as is formed by casting a composite ingot and then rolling and drawing it to the desired size. For instance, a lead-tin alloy may be cast in a copper cylinder or tube to form a composite ingot having a cast lead-tin alloy core within a copper jacket. Such a combination is ductile and may be rolled and drawn to the desired rod size. Lead-tin alloy is readily pumped through a relatively great length of copper tubing.

All of the various modifications of composite rods for lead-bronze welding, above described, are made from lead-tin alloy and copper elements. As a further modification of this invention, the composite weld rods may be made from lead and copper-tin alloy (bronze) components. Further modifications consist of the use of a lead-tin alloy and a copper-tin alloy in which the total desired tin content is split between the ductile components. Still another modification is to provide the lead, tin and copper each as unalloyed components. This invention embraces any combination in which the aggregative total of the elements in the components is the same as the components in lead-bronze, and in which the individual components are ductile. The use of de-oxidized copper and other alloys which introduce a minor amount of alloying ingredients to the weld metal is in no way a deviation from the present inventions as contemplated herein.

The cost of producing the improved weld rod of this invention is substantially lower than the cost of producing small diameter weld rods of lead-bronze alloy, primarily because the separate elements are ductile and can be easily worked and drawn either separately or after mechanical union, to form weld rods of the desired size. Further economy is realized by virtue of the fact that a large number of different alloy weld deposit compositions may be made from weld rods formed by mechanically combining a small number of ductile component parts in different size and numerical relations. For example, with only three component wires (lead, tin and copper) composite rods can be formed that will deposit a large number of lead-bronze alloys. This is accomplished by combining the elemental components in different numbers and sizes as required. For instance, one lead, one tin and three copper wires can be twisted together to form a composite weld rod that will produce a given lead-bronze alloy weld deposit. From the same stock, two lead, one tin and three copper wires could be combined to form a composite weld rod that produces a wholly different lead-bronze alloy. Such composite rods can be made to order from the elemental stock wires as desired, whereas if alloy rods were used, separate heats of alloy would have to be prepared for each.

In addition, weld rods made according to the present invention can be wound on a reel for use in a continuous welding operation, which is not possible with lead-bronze alloy weld rods.

In certain instances, where twisted or braided wires or the like are to be used as continuous electrodes in any arc welding process such as that disclosed by Muller et al., it has been found advantageous to roll out the majority of surface undulations to facilitate the passage of the electrode through the apparatus and to facilitate the transfer of welding current to the electrode. Such an electrode is illustrated in Fig. 2.

It has been found that this invention is particularly well adapted for lead-bronze welding with the inert gas shielded metal arc welding process of the Muller et al. patent. Such a welding process is continuous and requires a continuous wire electrode which cannot be supplied, for all practical purposes, except in coiled form. With the present invention, an electrode for lead-bronze welding can be supplied in coil form. In addition, with such a welding process, the electrode elements can be transferred to the work without chemical reaction. This means that the weld metal deposited from a composite electrode, according to this invention, will be an alloy having the same ratio of elemental constituents as the electrode had in aggregation. This is an important advance in the deposition of lead-bronze that permits accurate control of the weld deposit composition.

It is to be understood that this invention is not limited to the specific embodiments illustrated and described herein, but may be used in other ways without departure from its spirit as defined by the following claims.

What is claimed is:

1. The method of forming a weld rod for lead-bronze welding which comprises substantially completely surrounding a core wire of an alloy of lead and tin with a plurality of strands of copper wire and applying pressure to the composite rod so formed to reduce its diameter and extrude the lead-tin alloy core to substantially completely fill the interstices between said core and said several strands and place said core and said strands in intimate contact to increase the thermal and electrical conductivity therebetween.

2. In a composite arc welding electrode comprising a plurality of individual strands one of which is more readily melted by exposure to the heat of the welding arc than the remainder of said strands, the improvement which comprises forming the more readily melted strand in the center of said electrode as a core substantially completely surrounded by the remaining strands, said surrounding strands being forced into intimate contact with said core with sufficient pressure to permanently deform at least one of said strands to substantially conform to the original surface contour of the other of said strands in an amount to produce surface contact between the several strands and thereby effect good thermal and electrical conductivity between the several strands to provide an electrode having uniform burn-off characteristics.

3. A weld rod for lead-bronze welding which comprises a core wire of an alloy of lead and tin surrounded by a plurality of strands of twisted copper wire and in which said core wire is formed with a surface contour conforming substantially to the original surface contour of the adjacent copper wire strands to eliminate substantially all voids in said rod and provide good thermal and electrical conductivity between the several strands of said rod.

4. A weld rod for lead-bronze welding which comprises a core wire of an alloy of lead and tin surrounded by a plurality of strands of copper wire, said lead-tin alloy core being extruded by force applied to said surrounding copper wire strands to substantially completely fill the interstices between said core and said several strands and place said core and said strands in intimate contact to effect good thermal and electrical conductivity therebetween.

5. In a consumable stranded wire arc welding electrode of the type adapted to be fed through a sliding contact for the introduction of welding current thereto and which comprises a plurality of wire strands including a plurality of copper strands and a strand of other material, said strand of other material being capable of alloying with the remaining wire strands to form a copper base alloy, the strand of said other material having a substantially lower thermal and electrical conductivity than said remaining wire strands and being substantially more readily melted than said remaining wire strands when subjected to the heat of the welding arc, the improvement which comprises wrapping said remaining wire strands around and in intimate electrical and thermal contact with the strand of said other material to protect said strand of other material from the heat of the arc and produce uniform burnback as said electrode is fed through the contact to said arc.

References Cited in the file of this patent

UNITED STATES PATENTS

| Number | Name | Date |
|---|---|---|
| 1,361,269 | Mattice | Dec. 7, 1920 |
| 1,437,257 | Mattice | Nov. 28, 1922 |
| 1,756,972 | Conner | May 6, 1930 |
| 2,301,320 | Phillips | Nov. 10, 1942 |
| 2,349,945 | Dodd | May 30, 1944 |

FOREIGN PATENTS

| Number | Country | Date |
|---|---|---|
| 302,064 | Great Britain | Dec. 13, 1928 |